UNITED STATES PATENT OFFICE.

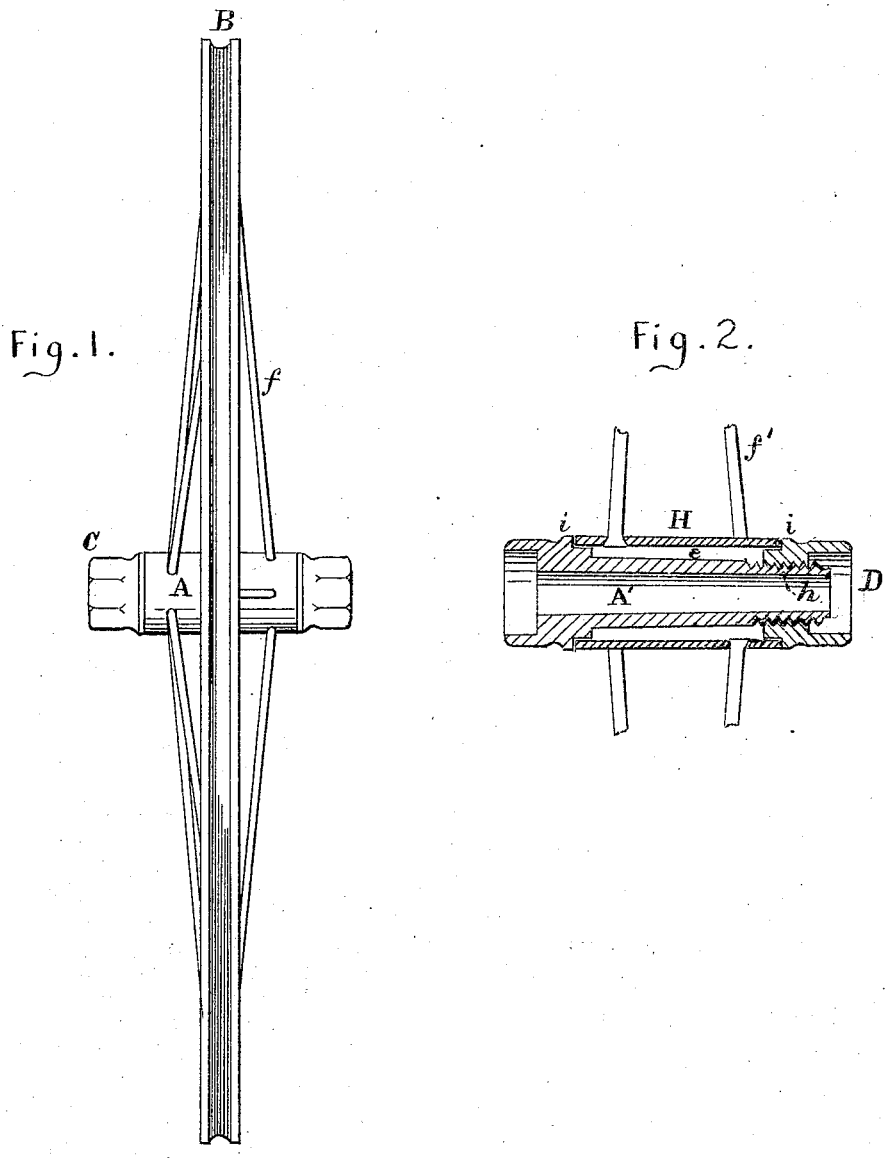

JOHN FREDENBURGH, OF GREENE, NEW YORK.

IMPROVEMENT IN WHEELS FOR VEHICLES.

Specification forming part of Letters Patent No. 153,557, dated July 28, 1874; application filed June 12, 1874.

*To all whom it may concern:*

Be it known that I, JOHN FREDENBURGH, of Greene, in the county of Chenango and State of New York, have invented certain new and useful Improvements in Wagon-Wheels; and I do hereby declare the following to be a full, clear, and exact description of the invention, such as will enable others skilled in the art to which it pertains to make and use it, reference being had to the accompanying drawings, which form part of this specification.

My invention consists in such a construction of the axle-box that the hub rests upon shoulders of the box instead of upon the whole length of the box, so that if the box swells fast on the carriage-axle from its becoming heated, the hub, in this emergency, will turn safely upon the shoulders of the box.

Figure 1 represents a perspective view of a wagon or carriage wheel.

A is the hub, consisting of a plain band of iron, steel, or metal of any kind, with a tier of holes near each end for the spokes $f$, which are also of metal of any kind, running through to the inside of said hub, which said holes are rimmed out to receive the head on each spoke, which is round and straight, and running alternately from each end of said hub to the center of the tire B, and is made fast to the same by means of screws on the end of said spokes, and outside of said tire, the other or lower end of said spokes fitting in the same manner to the hub.

The tire B is so grooved as to receive a rubber or other elastic substance fastened in said groove in order to use on a light carriage to run noiselessly; or the said tire can be flat.

C is a pipe or hollow steel or metal box, which forms a part of the hub A when the wheel is put together.

The box C and hub and wheel are put together by means of the said box being run through the said hub; and on the end of said box C is a thread so made as to admit of receiving the nut D, as shown in the longitudinal view, Fig. 2, which nut is so made as to have a shoulder on the inner side, and fitting closely inside of the hub A when screwed onto said box; and the said box C, at the inside of said hub, has a shoulder fitting in the same manner to said hub, so that when the said box is run through the said hub, and the said nut is screwed on, the wheel, with the said hub, will rest and revolve on the said shoulders of said nut and box.

The said box is so made as to be smaller between the said shoulders, leaving a vacant space, $e$, as shown in Fig. 2, so in case the wheel receives a heavy weight or blow, the spokes may give way and slip through the hub and onto the said box, it thereby being compelled to spring back to its original place without bending or breaking.

By means of the said box being so constructed as to leave a vacant space, as hereinbefore named, in case the box becomes heated or tightens, the wheel will turn on the box safely.

Fig. 2 is a longitudinal view of the said box, hub, and spokes, A representing the box, with thread on the end at $h$, and D the nut, as screwed onto the outer end of said box, and $i$ the shoulder on said box on the inside, and $i$ the outside of said wheel, and upon which the said hub H rests and revolves, thus leaving any desired space between the said box and hub between the said shoulders, so as to permit the said spokes to slip through the said hub in case of heavy pressure or weight on the said wheel, and spring back to their place.

The said hub and box are so made as to admit of said wheel being used with either side out.

I am aware that a hollow metal box is not new, and also that boxes have been made which are readily detachable from the hub, having particular reference to lightness of construction of the whole wheel. But while I have endeavored to include all these advantages, I define the gist of my invention to be this: Providing the box with shoulders, so that the hub rests upon only a single point of the box, instead of upon its whole length, whereby, if the box becomes heated and swells fast on the carriage axle, the hub, in this emergency, will safely turn upon the shoulders of the box.

I claim as my invention—

The combination of the axle-box C with the hub A, so that the hub rests only upon shoulders on the box, for the purpose specified.

In testimony that I claim the foregoing I have hereunto set my hand this 15th day of December, 1873.

JOHN FREDENBURGH.

Witnesses:
 JOHN J. RAMSEY,
 E. R. HATHAWAY.